United States Patent Office 3,424,715
Patented Jan. 28, 1969

3,424,715
STABILIZED PLASTIC COMPOSITIONS CONTAINING AN ULTRAVIOLET ABSORBING COMPOUND AND AN ORGANOPHOSPHORUS SULFIDE
Adam F. Kopacki, Westwood, N.J., and Jerry Horodecky, Jackson Heights, N.Y., assignors to Stauffer Chemical Company, New York, N.Y., a corporation of Delaware
No Drawing. Filed Oct. 23, 1964, Ser. No. 406,159
U.S. Cl. 260—45.9                                4 Claims
Int. Cl. C08f 45/58, 29/02

ABSTRACT OF THE DISCLOSURE

Solid polymer compositions consisting essentially of a mono alpha olefin having from 2 to 10 carbon atoms, and as a light stabilizer for the polymer compositions a combination of an ultraviolet absorber consisting of 2-hydroxy-4-n-octyloxybenzophenone and an organophosphorus sulfide selected from bis(diphenylphosphinothioyl) monosulfide and bis(diphenylphosphinothioyl) disulfide.

---

This invention relates to an improvement for protecting polymeric materials against deterioration resulting from exposure to actinic radiation such as light and ultraviolet light. The invention is particularly concerned in preventing this type of deterioration in organic plastics by incorporating therein an ultraviolet absorbing compound in synergistic combination with an organophosphorus sulfide.

It is well known that the photocatalyzed degradation of organic plastic materials as the result of exposure to sunlight or other sources of actinic radiation can be considerably retarded by incorporating in the plastic certain chemical additives. The protective action afforded by such additives resides in their unusual efficiency as absorbers of ultraviolet light which is the spectral range particularly harmful to organic polymers. As a consequence, the greater proportion of the detrimental radiation is taken up by the additive thereby leaving the plastic substrate relatively unscathed. Generally speaking, the region of the spectrum causing the maximum degradation for most plastics lies between 300–400 mu. The ideal ultraviolet absorber exhibits peak absorption at the wave lengths where the particular plastic is most sensitive.

Although the principal requirement of an ultraviolet absorber is that it provide the proper spectral response, other properties also are necessary in practice. These include light stability, heat stability, low color, compatibility and low volatility. A desideratum from the commercial standpoint is low manufacturing costs. Because of such narrow and stringent specifications, it is not too surprising that very few materials have achieved practical significance. In fact, almost all of the ultraviolet absorbers which are used commercially can be classified as (1) salicylates; (2) benzophenones; (3) benzotriazoles; and (4) substituted acrylonitriles. Numerous derivatives of the aforenamed basic structures have been prepared in order to achieve improved compatibility with a wider range of plastics. Exemplary compounds are given in the following list:

Salicylates
(1) Phenyl salicylate.
(2) 4-tert.-butylphenyl salicylate.
(3) 4-octylphenyl salicylate.

Benzophenones
(4) 2-hydroxy-4-methoxybenzophenone

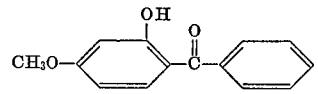

(5) 2,2'-dihydroxy-4-methoxybenzophenone

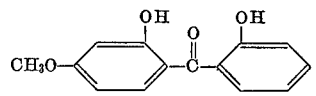

(6) 2,2'-dihydroxy-4-n-octoxybenzophenone

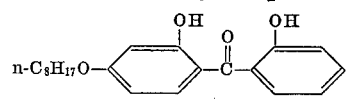

(7) 2-hydroxy-4-n-octoxybenzophenone

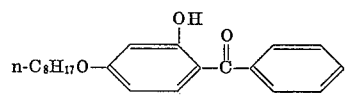

(8) 5-chlor-2-hydroxybenzophenone

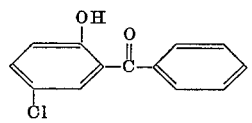

(9) 2,4-dibenzoylresorcinol

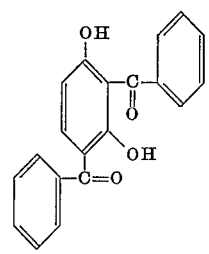

(10) Resorcinol monobenzoate

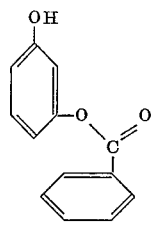

(11) 4-dodecyloxy-2-hydroxybenzophenone

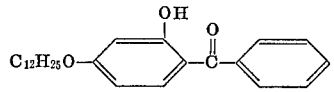

(12) 2,4-dihydroxybenzophenone

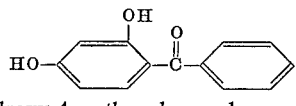

(13) 2-hydroxy-4-methoxybenzophenone

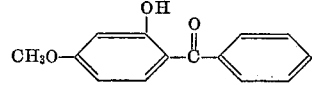

(14) 2,2'-dihydroxy-4,4'-dimethoxybenzophenone

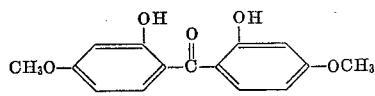

(15) 2,2',4,4'-tetrahydroxybenzophenone

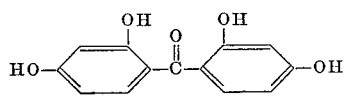

(16) 2-hydroxy-4-methoxybenzophenone-5-sulfonic acid

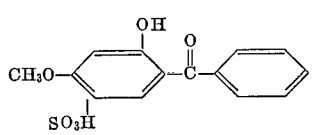

(17) Sodium 2,2'-dihydroxy-4,4'-dimethoxy-5-sulfobenzophenone

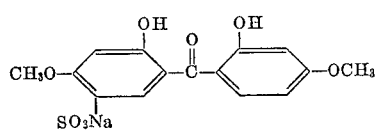

Benzotriazoles

(18) 2-hydroxyphenylbenzotriazole and alkyl substituted derivatives thereof.

Whereas the ultraviolet absorbers presently available on the market are generally satisfactory, they may not always afford sufficient protection of plastics in the presence of excessive radiation. For instance, some of the newer synthetic resins, because of their excellent structural characteristics, are being used extensively by industry and the building crafts. In the case of outside installations, the plastic must withstand prolonged exposure to periods of sunlight without significant weakening or failing in tensile strength. Although increasing the amount of ultraviolet absorber is effective up to a point, the plastic can tolerate only so much additive, usually in the neighborhood of a few percent. Moreover, the degree of protection does not rise in proportion to the additive. In fact, the use of too much additive may even be less effective than smaller amounts. It would thus seem to appear that even the most efficient ultraviolet absorbers are not capable of filtering out all of the radiation, especially under the extended periods of exposure as where plastic materials are employed in outside construction. Manifestly, the art has need for even more effective means of protecting plastics against photodegradation.

In accordance with the present invention, it has been discovered that protective action provided by the commercial ultraviolet absorbers, i.e. aromatic salicylates, benzophenones and the benzotriazoles, can be extended or emphasized by using them in association with an organic phosphorus sulfide thereby making it possible to realize plastic compositions having hitherto unattainable resistance to photodegradation.

We have not as yet been able to fully explain the unusual efficacy of the plastic stabilizer compositions of the invention. It would appear that the organic phosphorus sulfide functions as a true synergist so as to amplify the protective power of the ultraviolet absorber since the combination of the two components far exceeds that of a comparable amount of either ingredient alone. In fact, we have found that a combination of the commercial ultraviolet absorber and organic phosphorus sulfide generally doubles the life of the polymer as against a like quantity of a commercial ultraviolet absorber. Since the organic phosphorus sulfides do not possess appreciable absorption in the ultraviolet or visible region of the spectrum, the action of such entities cannot be accounted for on the basis of merely acting or functioning as a complimentary absorber for the principal absorber. If the aforesaid were true, then the combination of an ultraviolet absorber and the organic phosphorus sulfide would not be expected to differ significantly in protective action than a comparable amount of a single component. However, as previously pointed out, the combination is twice as effective as a like amount of a commercial ultraviolet absorber.

In seeking to explain the singular stabilizing efficacy of the compositions of the invention, it has been suggested that the organic phosphorus sulfide neutralizes or otherwise dissipates the energy of the activated polymer chemical bonds as a result of absorption of the incident radiant energy not stopped or taken up by the principal ultraviolet absorber. Such activated polymer bonds tend to break down if the absorbed energy is not dissipated in time to prevent photodecomposition of the polymer bonding system. Apparently the organic phosphorus sulfide functions as an acceptor of the absorbed energy of the activated polymer bonds, probably by transforming it into heat or vibrational energy thereby restoring the polymer bond to its unexcited and stable state. Thus, the ultraviolet absorber filters or screens out most of the incident radiation while the organic phosphorus sulfide acts as a scavenger to take up any residual actinic radiation which escapes the ultraviolet absorber. In other words, the combination of the ultraviolet absorber and the organic phosphorus sulfide operates to check or neutralize the incident radiation thereby effectively protecting the plastic substrate from photodegradation. It is to be understood, however, that the aforesaid explanation is offered merely as a hypothesis to account for the action of our stabilizer compositions and is not to be taken as imposing any restrictions or limitation of the invention.

The organophosphorus sulfides which are contemplated herein are in many instances known chemical entities, the description and preparation of which can be found in the technical literature. In general, the bis(diarylphosphinothioyl) sulfides are prepared by heating the corresponding diphenylphosphinothioic acid or diphenylphosphinodithioic acid in accordance with the method disclosed in U.S. Patent No. 2,727,067. The reaction is preferably carried out at temperatures above 100° C. but below the melting point of the diphenylphosphinic acid starting materials. It will be observed that the aforedescribed synthesis is designed to give symmetrical structures as a result of oxidative coupling of the reactants. However, unsymmetrical derivatives can also be realized by first forming the bis-(diphenylphosphinothioyl) sulfide or disulfide followed by the introduction of various substituents on the phenyl ring by means of reactions commonly employed to effect aromatic substitutions. Bis(diphenylphosphinothioyl) sulfides and disulfides which are suitable in practicing the invention can be formalistically depicted as follows:

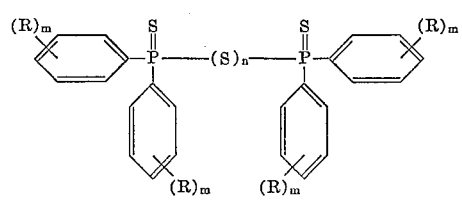

wherein R represents hydrogen, hydroxy, chlorine, lower alkyl, e.g. methyl, ethyl, n-propyl, n-butyl, sec.-butyl, tert.-butyl, etc., lower alkoxyl, e.g. methoxy, ethoxy, n-propoxy, n-butoxy, iso-butoxy, etc., and $n$ is an integer of from 1 to 2 and $m$ is an integer of from 1 to 5. Exemplary structures falling within the ambit of the afore-described general formula include the following:

A. 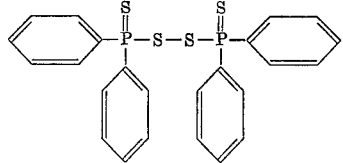

B. 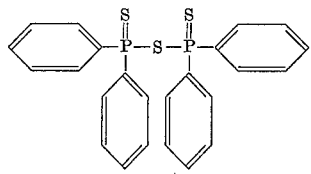

C. 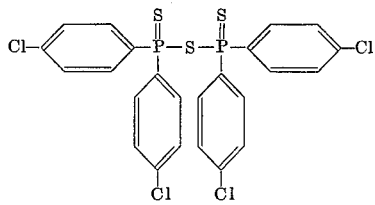

D. 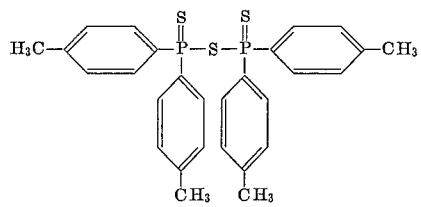

E. 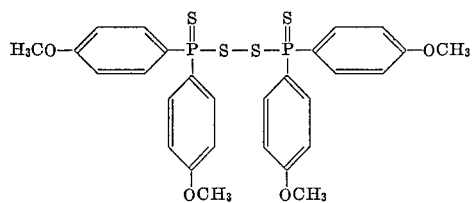

F. 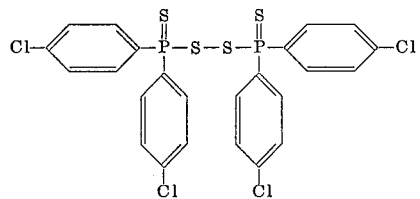

G. 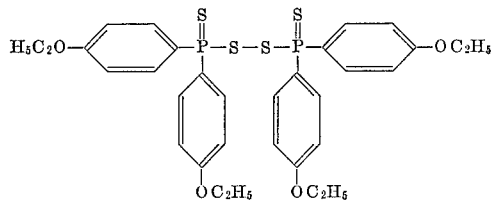

H. 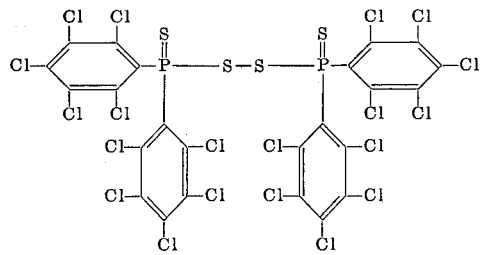

I. 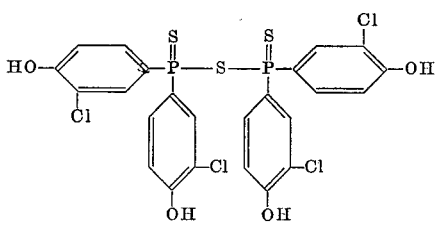

J. 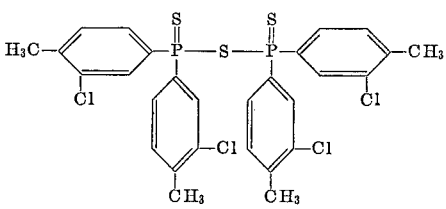

K. 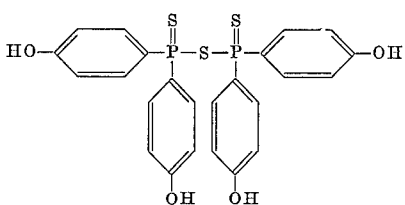

The organophosphorus sulfides as contemplated herein are unusually stable organic substances, particularly with respect to their resistance to photodegradation. In this connection, we have exposed test samples of these compounds for extended periods in a Weatherometer with no signs of breakdown. In fact, the test compounds endured exposure periods exceeding 500 hours without exhibiting detectable breakdown. Moreover, the organophosphorus sulfides are compatible with the usual classes of synthetic resins and plastics and because of their relative inertness do not react or interfere with other additives such as antioxidants, pigments, plasticizers or the like.

The polymers stabilized as contemplated herein can be cast, extruded, rolled or molded into sheets, rods, tubes, piping, filaments and other shaped articles, including sheets or films ranging from 0.5 to 100 mils in thickness. The polymer compositions of our invention can be applied as coatings to paper, cloth, wire, metal foil and are suitable for the manufacture of synthetic fibers and fabrics.

Although the quantity of stabilizer composition is not particularly critical, it is recommended that the concentration based on the weight of the polymer be maintained in the neighborhood of about 0.01 to about 5.0% of the combined ultraviolet absorber and organic phosphorus sulfide. An especially effective ratio consists of about 0.2% of each component.

The organophosphorus sulfide/ultraviolet absorber compositions as described herein are suitable for stabilizing a wide variety of solid polymer compositions against deterioration brought on by exposure to actinic radiation. In this connection mention is made of any of the normally solid polymers derived from the polymerization of α-mono-olefinic aliphatic and aryl-substituted aliphatic hydrocarbons containing from two to ten carbon atoms. Typical poly-α-olefins include polyethylene, polypropylene, poly(3-methylbutene-1), poly(4-methylpentene-1), poly-(pentene - 1), poly(3,3 - dimethylbutene-1), poly(4,4-dimethylbutene-1), poly(octene-1), poly(decene-1), polystyrene and the like. Copolymers of such olefins as those prepared from ethylene and propylene or ethylene and the butenes or the like are also protected as are polydiolefins, i.e. polybutadiene or polyisoprene and olefin-diolefin copolymers of the type as butadiene-styrene or isobutylene-isoprene copolymers. Polymeric materials prepared from olefins and/or diolefins containing some vinylic monomers such as acrylonitrile or vinyl chloride as illustrated by the so-called ABS resins, acrylonitrile, butadiene and styrene terpolymers, are considered to be within the scope of this invention as are polymers of substituted vinyl monomers such as vinyl chloride, vinylidene dichloride, vinyl acetate, acrylonitrile and the like. So also are the polyester resins with and without added styrene, divinylbenzene and the like.

We have ascertained that the stabilizer compositions of the invention are excellent for preventing photo-degradation by ultraviolet light or sunlight of stereoregular polyolefins such as isotactic polypropylene. Isotactic polypropylene is a stereoregular polymer wherein the monomeric units are linked predominantly head to tail with the methyl groups on one side of the helical chain rather than the more common arrangement with methyl groups randomly distributed on both sides of the chain. Moreover, this isotactic or singular arrangement of substituents attached to the chain promotes an orderly alignment of the molecules. Such stereoregular polymers often exhibit a high degree of crystallinity and are much superior in physical properties to atactic polymers having a random distribution of monomeric units. Stereoblock polymers wherein long segments of the chain are in one configuration or the other and also polymers with amorphous regions are also protected. For a fuller description of such polymers, reference is made to the Scientific American, 197 No. 3, pages 98–104 (1957); 205 No. 2, pages 33–41 (1961). Amorphous or appreciably amorphous polymers are also stabilized.

Although the molecular weight of polymers varies over wide limits, the stabilizer compounds of the invention are not restricted to any particular molecular weight range of polymer, and in fact it has been our finding that excellent protection can be realized with polymers having a broad or narrow range. Moreover, the so-called amorphous low molecular weight poly-α-olefin waxes or oils are likewise susceptible to stabilization by means of the compounds of the invention.

Polyesters which can be protected against ultraviolet radiation by means of the herein described stabilizer compositions are well known chemical entities and are described at length in the technical literature and numerous U.S. patents. One type of polyester is derived from the addition polymerization of ethylenically unsaturated organic esters, particularly vinyl ester monomers, and in this connection mention is made of acrylic esters, vinyl esters and in general any organic ester containing a

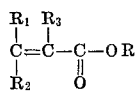

configuration wherein R, $R_1$, $R_2$ and $R_3$ represent hydrogen or an organic hydrocarbyl substituent. The polymerization is commonly effectuated by contacting the monomer with a polymerization initiator such as an organic peroxide with or without the application of heat.

Another type of polyester which can be stabilized in accordance with the invention is formed by the successive esterification of dicarboxylic acids with polyglycols. The resulting polymeric ester consists of alternate linkages of the dicarboxylic acid and polyglycol residues produced by the elimination of water from between the reactants. The resulting polymers may be linear or cross-linked depending on the selection of the components. For instance, a diglycol wherein the hydroxyl groups are terminally situated produce a linear type of polyester whereas such polyglycols as exemplified by glycerol give rise to a cross-linked polymer such as those formed by reacting glycerol with the dicarboxylic acid, phthalic acid, in the form of its anhydride.

Modifications of polyesters are the well known alkyd resins which are obtained by forming a polyester by reacting a polyglycol and an alpha-beta-ethylenically unsaturated di- or polycarboxylic acid and cross-linking the residual ethylene double bonds with a suitable cross-linking agent.

In a more specific and detailed sense, the alkyd resins as above referred to having a plurality of polymerizable alpha-beta-ethylenically unsaturated linkages may be produced by combining together a polyhydric alcohol with a polycarboxylic acid or its anhydride which contains alpha-beta-ethylenic unsaturation. It is generally understood that the acid or its anhydride includes the designation polycarboxylic acid and such terminology will be understood in the description as herein set forth. Saturated carboxylic acids are also frequently included in the reaction mixture for the purpose of modifying the properties of the resin. From the standpoint of costs, the unsaturated polycarboxylic acids most commonly utilized are maleic, usually in the form of the anhydride, and fumaric acid. Other alpha-beta-unsaturated carboxylic acids which may be employed are exemplified by citraconic, itaconic, aconitic and mesaconic acids. The chemical and technical literature can be consulted for the names of other suitable acids. An acid often used for modifying the properties of a polyester resin is phthalic acid, commonly in the form of its anhydride. Other such acids with benzenoid or aromatic unsaturation which behave as saturated acids in that their benzenoid unsaturated structure does not enter into any common ethylenic type polymerization are commonly selected to produce various and particular properties and effects in the alkyd resin. In this connection, reference is made to such acids as isophthalic, adipic, azelaic, tetrachlorophthalic acid, sebacic, suberic, endomethylenetetrahydrophthalic and hexachloroendomethylenetetrahydrophthalic.

As illustrative of the polyhydric alcohols applicable for the synthesis of alkyd resins, mention is made of ethylene glycol, diethylene glycol, propylene glycols, dipropylene glycol, butylene glycol and the like. Here again, the literature may be consulted for the names of the less common polyglycols. It should be pointed out that as with the dicarboxylic acid, a polyglycol alcohol may be selected which is ethylenically unsaturated and thereby giving residual ethylenic double bonds for the purpose of cross-linking the polyester with concomitant modification in physical and chemical properties.

In preparing an alkyl resin, the polycarboxylic acid and appropriate polyhydric alcohol are commonly reacted at elevated temperatures in the presence of an inert atmosphere. The reaction is normally carried out at a temperature ranging from about 150° C. to about 230° C.; the inert atmosphere is conveniently provided by carbon dioxide or nitrogen gas. Generally, the total number of moles of alcohol exceeds the total number of moles of acid by about 5 to 20% since the latter figures are required to effect complete esterification, although the proportions are not critical. A relatively inert organic solvent such as xylene is sometimes useful in carrying out the reaction. Since the reaction is an esterification, water is given off and should be removed from the system. After essentially all of the water has been expelled, any solvent is removed and after the mixture cools, the appropriate unsaturated monomeric cross-linking agent added. If cross-polymerization or linkage is to be prolonged, the presence of a suitable inhibitor is necessary.

Unsaturated monomers suitable for use as cross-linking agents can be selected from a wide variety of polymerizable compounds characterized by the presence of a $CH_2$=CH— group. Examples of such monomers are styrene, vinyltoluene, methylacrylate, divinylbenzene, diallylphthalate, dimethylstyrene, methylmethacrylate, vinylacetate, butadiene, and the like. It is also a common practice to employ special monomers in order to secure particular effects. In this connection, mention is made of triallylcyanurate useful in imparting high heat resistance to resins, alkylallyldiglycolate for use as a refractive modifier, while diallylphenylphosphonate has been employed to impart fire resistance.

Three groups of components which we have found particularly suitable and convenient for preparing polyesters are: (1) acids such as maleic, fumaric, itaconic, phthalic and the like; (2) alcohols or glycols such as allyl alcohol, ethylene glycol and diethylene glycol; (3) unsaturated hydrocarbons such as styrene, cyclopentadiene and the like. For example, the polyesters disclosed in U.S. Patent No. 2,255,313 are illustrative of these unsaturated polyesters. Also polyesters such as generally described in U.S. Patent No. 2,443,736, containing an alkenyl aryl cross-linking agent, such as diallyl phthalate, and the reaction product of an alpha, beta ethylenically unsaturated polycarboxylic acid, such as maleic or fummaric acid, a saturated polycarboxylic acid free of non-benzoid unsaturation, such as phthalic acid, and at least one glycol, such as ethylene glycol and/or diethylene glycol may be used.

The amounts of the components useful in preparing polyesters may vary widely. In most instances, approximately two parts by weight of an unsaturated alkyd resin to one part by weight of the monomeric cross-linking agent is suitable although as above mentioned, the proportions may be varied over wide limits.

Another important polymer which can be stabilized in accordance with the invention is polyvinylchloride. This polymer is commonly produced by the emulsion polymerization using a redox initiator for polymerizing vinyl chloride. One type of polyvinylchloride is the so-called rigid or unplasticized polyvinylchloride and this particular modification of polyvinylchloride can be effectively stabilized by the compounds of the invention. As has previously been pointed out elsewhere herein, the organophosphorus sulfides are effective as stabilizers either for the polymers themselves or various copolymers and terpolymers and mixtures thereof. One class of polymer composition which lends itself to stabilization by means of the compounds of the invention is resin mixtures which are blends or copolymers of a plastic such as polystyrene or styrene-acrylonitrile copolymer with a rubber usually a butadiene-acrylonitrile copolymer. Such compositions may be intimate physical mixtures of the two components, the so-called polyblends or a true terpolymer, that is, an ABS resin, possibly produced by block or graft techniques. An example of the latter case is a graft copolymer of styrene on nitrile rubber. Typical compositions include 20–30% acrylonitrile, 20–30% butadiene and 40–60% styrene. The abbreviation ABS is taken from the initial letters of the three monomers.

For a more detailed description of the various polymers, copolymers and terpolymers which are susceptible to stabilization in accordance with the invention, they are described at great length in the technical and chemical publications. In this connection, reference is made to such well-known treatises as "Polyester Resins" by J. R. Lawrence, Reinhold Publishing Corp., New York (1960) and "Textbook of Polymer Science" by F. W. Billmeyer, published by Interscience Publishers, New York (1962).

The following examples illustrate the procedure for preparing stabilized polymer compositions of the invention although the inclusion of such examples is not to be taken as limiting or otherwise imposing any restriction on the invention, and it is to be understood that variations in practicing the same without departing from the scope or spirit thereof will be apparent to those skilled in the art to which the said invention pertains.

Example 1

A dry blend consisting of 0.1% of a commercial ultraviolet absorber plus 0.1% of an organophosphorus sulfide of the invention and 50 g. of isotactic polypropylene was subjected to extrusion-compounding in the usual manner at a temperature of 400° F. for six minutes at 2000 p.s.i. The blended polymer was extruded into a 25 ml. sheet and thereafter cut into square samples measuring 2 inches. A like sample containing no stabilizer was also prepared and tested. The samples were then exposed in a Xenon Arc Weatherometer operating at 6000 watts. The water cycle was adjusted whereby each sample was subjected to 18 minutes of water spray for each two hours of dry exposure. Exposure damage to the samples of polypropylene was assessed with respect to change of structural strength. The results of the test are summarized by the data set forth in the table below:

TABLE

|  | Hours to Embrittlement | |
|---|---|---|
|  | Test 1 | Test 2 |
| (1) 0.2% CYASORB UV 531 [1] | 644 | 630 |
| (2) 0.2% bis(diphenylphosphinothioyl) mono-sulfide | 638 | 802 |
| (3) 0.2% bis(diphenylphosphinothioyl) disulfide | 600 | 857 |
| (4) 0.1% of 1+0.1% of 4 | 1,361 | 1,361 |
| (5) 0.1% of 1+0.1% of 3 | 1,107 | 1,226 |

[1] CYASORB UV 531 is 2-hydroxy-4-n-octyloxybenzophenone.

The exposure is reported as the number of hours in the Weatherometer which produces structural failure of the sample which for the purposes of these tests refer to the degree of brittleness which causes the samples to break when flexed through 180° C.

The Weatherometer as used in compiling the data and tests described herein was purchased from the Atlas Electric Devices Company, Chicago, Ill. The instrument is identified as a 6000 watt Xenon Arc Weatherometer Model 60W.

The polypropylene resin was an unstabilized general purpose, high molecular weight polypropylene of the isotactic or crystalline type. Typically, it has a melt index of 4 at 230° C. and a specific gravity of 0.905.

Example 2

The procedure of Example 1 was repeated but substituting polyethylene in lieu of polypropylene. In general, the results paralleled those obtained in the first example.

Example 3

The procedure of Example 1 was repeated except that the polypropylene was replaced by polyvinylchloride. In general, the degree of stabilization was comparable to that obtained in the previous examples.

Example 4

The procedure of Example 1 was repeated but in this case the polymer was a terpolymer obtained by polymerizing a mixture of acrylonitrile, butadiene and styrene. The terpolymer used in this example was of the high impact type commonly referred to in the trade as ABS polymers.

We claim:
1. A solid polymer composition consisting essentially of polypropylene and as a light stabilizer for the polymer composition a combination of an ultraviolet absorber consisting of 2-hydroxy-4-n-octyloxybenzophenone and an organophosphorus sulfide selected from bis(diphenylphosphinothioyl) monosulfide and bis(diphenylphosphinothioyl) disulfide.

2. A polymer composition of claim 1 wherein the combined concentration of ultraviolet absorber and organophosphorus sulfide is from about 0.01% to about 5.0% based on the weight of the polymer.

3. A solid polymer composition comprising polypropylene and as a light stabilizer for the polypropylene a combination containing as its essential components at least about 0.2% by weight based on the polypropylene of 2-hydroxy-4-n-octyloxybenzophenone and at least about 0.2% by weight based on the polypropylene of bis(diphenylphosphinothioyl) sulfide.

4. A solid polymer composition comprising polypropylene and as a light stabilizer for the polypropylene a combination containing as its essential components at least about 0.2% by weight based on the polypropylene of 2-hydroxy-4-n-octyloxybenzophenone and at least about 0.2% by weight based on the polypropylene of bis(diphenylphosphinothioyl) disulfide.

References Cited

UNITED STATES PATENTS

| | | | |
|---|---|---|---|
| 2,732,366 | 1/1956 | Tubbs et al. | 260—45.8 |
| 2,919,259 | 12/1959 | Naylor et al. | 260—45.95 |
| 3,213,058 | 10/1965 | Boyle et al. | 260—45.8 |
| 3,244,667 | 4/1966 | Burgess | 260—45.85 |
| 3,264,257 | 8/1966 | Giolito et al. | 260—45.95 |

DONALD E. CZAJA, *Primary Examiner.*

M. J. WELSH, *Assistant Examiner.*

U.S. Cl. X.R.

260—45.7, 45.8, 45.85